E. N. BRODERICK.
FLOAT.
APPLICATION FILED AUG. 23, 1911.
1,072,420.
Patented Sept. 9, 1913.
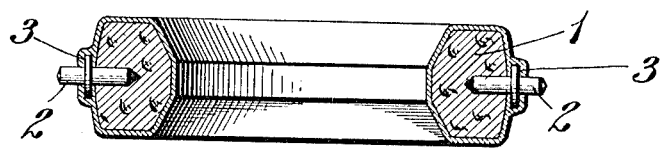
Witnesses
Chas. W. Stauffiger
Anna C. Paviles
Inventor
Ernest N. Broderick
By
Attorneys.

UNITED STATES PATENT OFFICE.

ERNEST N. BRODERICK, OF DETROIT, MICHIGAN.

FLOAT.

1,072,420.  Specification of Letters Patent.  Patented Sept. 9, 1913.

Application filed August 23, 1911. Serial No. 645,539.

*To all whom it may concern:*

Be it known that I, ERNEST N. BRODERICK, a citizen of the United States of America, residing at Detroit, in the county of Wayne and State of Michigan, have invented certain new and useful Improvements in Floats, of which the following is a specification, reference being had therein to the accompanying drawings.

This invention relates to a new process for making floats for carbureters, float-controlled valves and the like, and to a float produced by the process.

The invention consists, broadly, in forming a body of cork or like material of low specific gravity into the contour and dimensions of the required float, and in depositing, electrolytically or otherwise, a coating of metal over the surface and in intimate contact therewith whereby the body of the float is rendered impervious to any liquid in which it may be immersed.

The invention is especially adapted for manufacture of floats of irregular form, or, with openings therethrough.

The invention consists in the matters hereinafter set forth, and more particularly pointed out in the appended claims.

The drawing is a view in section of a float made in accordance with the process which forms a part of the invention.

In carrying out the process, a body 1 is formed of cork or similar material of very low specific gravity. It may be annular, as herein illustrated, or of any preferred form. Its surface is preferably coated with paraffin or the like, or otherwise to insure the filling of the cavities and interstices thereon although this coating may be omitted as it does not necessarily constitute one of the important steps of the process. The core or body is then metalized either by dipping it into a bath or washing it with a solution of a metal salt in the presence of a suitable acid, whereby a sufficient layer of metal is placed upon an article to give it electrical conductivity. The body is then treated by electro-plating so as to coat it with the desired metal.

Pintles 2, hangers or other connections for mounting the float may be thrust into the core and secured there by depositing or electro-plating the sheathing around and on the pintles, preferably only on that portion of the pintles at or adjacent the body. A shoulder, flange, washer or ferrule, as indicated at 3 may be placed or formed on the pin or other fitting and the latter so inserted in the body that the part 3 is at an interval therefrom, and the metal sheathing is then deposited in this space only, firmly fastening the member in place.

The metal may be deposited in sufficient quantity upon the body by the first step to give it a sheathing of the weight desired without electro-plating it. Or the coating step may be omitted and a metal sheath be deposited upon the body by electro-plating. By either way a float is obtained having a core of great buoyancy and of sufficient rigidity to prevent deformation under ordinary use with a coating of metal which is impervious to the liquid in which the float is to be immersed when used. If accidentally punctured such float does not materially lose its buoyancy and may be readily repaired when the defect is noticed. The coating is readily applied and is seamless. A superior outer finish may be given to the float and it cannot be waterlogged or its buoyancy changed in any appreciable way.

It is to be noted that I do not confine myself to any particular way for applying the coating to the body nor do I care to limit myself to any particular material either for the body or for the coating other than the first shall be buoyant and of such character as not to readily lose its shape or become deformed under use, and the second shall be impervious to liquids.

What I claim is:—

1. A carbureter float comprising a solid body of low specific gravity, supporting members thrust into the body each having a shoulder at an interval from the surface of the body and a metal coating electro-plated upon the body and the members between the shoulders and body as a retaining means for the members and an impervious sheathing for the body.

2. A carbureter float comprising a cork body, supporting members thrust into the body each having a shoulder at an interval from the surface of the body, and a metal coating electro-plated upon the body and the members and between the shoulders and body as a retaining means for the members and an impervious sheathing for the body.

In testimony whereof I affix my signature in presence of two witnesses.

ERNEST N. BRODERICK.

Witnesses:
    LEWIS E. FLANDERS,
    OTTO F. BARTHEL.

Copies of this patent may be obtained for five cents each, by addressing the "Commissioner of Patents, Washington, D. C."